US012718827B2

(12) United States Patent
Malenovsky et al.

(10) Patent No.: US 12,718,827 B2
(45) Date of Patent: Aug. 25, 2026

(54) TIME-DOMAIN SUPERWIDEBAND BANDWIDTH EXPANSION FOR CROSS-TALK SCENARIOS

(71) Applicant: VOICEAGE CORPORATION, Town of Mount Royal (CA)

(72) Inventors: Vladimir Malenovsky, Brno (CZ); Milan Jelinek, Sherbrooke (CA)

(73) Assignee: VOICEAGE CORPORATION, Town of Mount Royal (CA)

( * ) Notice: Subject to any disclaimer, the term of this patent is extended or adjusted under 35 U.S.C. 154(b) by 157 days.

(21) Appl. No.: 18/727,579

(22) PCT Filed: Jan. 27, 2023

(86) PCT No.: PCT/CA2023/050117
§ 371 (c)(1),
(2) Date: Jul. 9, 2024

(87) PCT Pub. No.: WO2023/147650
PCT Pub. Date: Aug. 10, 2023

(65) Prior Publication Data

US 2025/0124936 A1 Apr. 17, 2025

Related U.S. Application Data

(60) Provisional application No. 63/306,291, filed on Feb. 3, 2022.

(51) Int. Cl.
*G10L 19/04* (2013.01)
*G10L 19/032* (2013.01)
*G10L 19/083* (2013.01)

(52) U.S. Cl.
CPC .......... *G10L 19/083* (2013.01); *G10L 19/032* (2013.01)

(58) Field of Classification Search
CPC ............................ G10L 19/083; G10L 19/032
See application file for complete search history.

(56) References Cited

U.S. PATENT DOCUMENTS

| | | | | |
|---|---|---|---|---|
| 2015/0106084 | A1* | 4/2015 | Atti ..................... | G10L 19/0208 704/226 |
| 2015/0162008 | A1 | 6/2015 | Villette et al. | |
| 2015/0162010 | A1 | 6/2015 | Ishikawa et al. | |

OTHER PUBLICATIONS

"Universal Mobile Telecommunications System (UMTS); LTE; EVS Codec Detailed Algorithmic Description (3GPP TS 26.445 version 12.0.0 Release 12)" (Year: 2014).*

(Continued)

*Primary Examiner* — Ibrahim Siddo
(74) *Attorney, Agent, or Firm* — Fay Kaplun & Marcin, LLP

(57) ABSTRACT

A method for time-domain bandwidth expansion of an excitation signal during decoding of a cross-talk sound signal, comprises decoding a high-band mixing factor received in a bitstream, and mixing a low-band excitation signal and a random noise excitation signal using the high-band mixing factor to produce the time-domain expanded excitation signal. A method for time-domain bandwidth expansion of an excitation signal during encoding of a cross-talk sound signal, comprises calculating a high-band residual signal using the sound signal and a temporal envelope of the high-band residual signal, calculating a high-band voicing factor based on the temporal envelope of the high-band residual signal, calculating a high-band mixing factor usable for mixing a low-band excitation signal and a random noise excitation signal to produce the time-domain expanded excitation signal, and estimating gain/shape parameters using the high-band voicing factor.

35 Claims, 9 Drawing Sheets

(56) References Cited

OTHER PUBLICATIONS

3GPP. TS 26.445, "EVS Codec Detailed Algorithmic Description," 3GPP Technical Specification (Release 12) (2014)—Sections 5.2.6.1, pp. 1-25 and 6.1.5.1., pp. 33-43.
3GPP TS 26.445, "EVS Codec Detailed Algorithmic Description," 3GPP Technical Specification, Release 12, 2014), Sections 5.2.6.1 to 5.2.6.1.17, pp. 214-239 and Sections 6.1.5.1. to 6.1.5.15, pp. 474-484.
Atti et al., "Super-bandwidth extension for speech in the 3GPP EVS codec", 2015 IEEE International Conference on Acoustics, Speech and Signal Processing (ICASSP), South Brisbane, QLD, Australia, 2015, pp. 5927-5931.
Kaniewska et al., "Enhanced AMR-WB bandwidth extension in 3GPP EVS codec", 2015 IEEE Global Conference on Signal and Information Processing (GlobalSIP), Orlando, FL, USA, Feb. 25, 2016, pp. 652-656.
Bessette et al., "Techniques for high-quality ACELP coding of wideband speech", Int. Conference EUROSPEECH 2001 Scandinavia, 7th European Conference on Speech Communication and Technology, 2nd INTERSPEECH Event, Aalborg, Denmark, Sep. 3-7, 2001, 4 sheets.

* cited by examiner

TIME-DOMAIN SUPERWIDEBAND BANDWIDTH EXPANSION FOR CROSS-TALK SCENARIOS

PRIORITY CLAIM

The present application is a National Phase Application of PCT Application Serial No. PCT/CA2023/050117 filed Jan. 27, 2023; which claims priority to U.S. Provisional Patent Application Ser. No. 63/306,291 filed Feb. 3, 2022. The disclosures of the above applications are incorporated herewith by reference.

TECHNICAL FIELD

The present disclosure relates to a method and device for time-domain bandwidth expansion of an excitation signal during encoding/decoding of a cross-talk sound signal.

In the present disclosure and the appended claims:

- The term "cross-talk" is generally intended to designate sound segments in which a first sound element is superposed to a second sound element, for example but not exclusively speech segments when a first person talks over a second person.
- The term "low-band" is intended to designate a lower frequency range. Although the 0 kHz-6.4 kHz and 0 kHz-8 kHz frequency ranges are given in the present disclosure as examples of "low-band", the frequency boundaries of the low-band frequency range may obviously be modified/adapted to the bitrate of a codec and/or to achieve specific goals such as compliance with application-, system-, network- and design/business-related constraints.
- The term "high-band" is intended to designate a higher frequency range. Although the 6.4 kHz-14 kHz and 8 kHz-16 kHz frequency ranges are given in the present disclosure as examples of "high-band", the frequency boundaries of the high-band frequency range may obviously be modified/adapted to the bitrate of a codec and/or to achieve specific goals such as compliance with application-, system-, network- and design/business-related constraints.

BACKGROUND

In many conversational applications there are often situations when one person talks over another person. As mentioned herein above, such situations are often referred to as "cross-talk". Cross-talk speech segments may be problematic in modern speech encoding/decoding systems. Since the traditional speech encoding technologies have been designed and optimized mainly for single-talk content (only one person talking), the quality of cross-talk speech may be severely impacted by the encoding/decoding operations. As an example, one of the most serious issues in cross-talk speech encoding/decoding in the 3GPP EVS codec (Reference [1] or which the full content is incorporated herein by reference) is the occasional presence of "rattling noise". "Rattling noise" is a strong annoying sound produced at frequencies from 8 kHz to 14 kHz, that is within the high-band frequency range examples as defined herein above.

At low bitrates of the 3GPP EVS codec the high-band frequency content is encoded/decoded using the super wideband bandwidth extension (SWB TBE) tool as described in Reference [1]. Due to the limited number of bits available for the SWB TBE tool the high-band excitation signal within the high-band frequency range is not encoded directly. Instead, the low-band excitation signal within the low-band frequency range is calculated using an ACELP (Algebraic Code-Excited Lineal Prediction) encoder (Reference [2] of which the full content is incorporated herein by reference), then upsampled and extended up to 14 kHz or 16 kHz depending on the high-band frequency range and used as a replacement for the high-band excitation signal. If there is a mismatch between the low-band excitation signal and the high-band excitation signal the synthesized sound may sound differently compared to the original sound. When the low-band excitation signal is voiced but the high-band excitation signal is unvoiced the synthesized sound will be perceived as the above defined rattling noise. The problem of rattling noise in the cross-talk content is illustrated in the spectral plot of FIG. 1.

The plot in FIG. 1 shows the power spectrum P versus frequency f of an exemplary cross-talk sound in which two speakers pronounce sounds of different types. While the sound from the first speaker (speaker 1) comprises dominantly voiced content the sound from the second speaker (speaker 2) contains an unvoiced segment. Assuming a mono capturing device such as a smartphone or an omnidirectional microphone the sounds from the two speakers will be mixed together inside the capturing device. As a result the spectral content of the input sound signal, as seen by the encoder, will resemble the superset of the two spectra. A similar situation arises in a multi-channel capturing device such as a stereo microphone or an ambisonic microphone. If the encoder contains a downmixing module the resulting mono input signal might contain different types of sounds clearly distinguishable in the spectral domain.

SUMMARY

The present disclosure relates to the following aspects:

- A method for time-domain bandwidth expansion of an excitation signal during decoding of a cross-talk sound signal, comprising: decoding a high-band mixing factor received in a bitstream; and mixing a low-band excitation signal and a random noise excitation signal using the high-band mixing factor to produce the time-domain bandwidth expanded excitation signal.
- A method for time-domain bandwidth expansion of an excitation signal during encoding of a cross-talk sound signal, comprising: calculating (a) a high-band residual signal using the sound signal and (b) a temporal envelope of the high-band residual signal; and calculating a high-band voicing factor based on the temporal envelope of the high-band residual signal.
- A method for time-domain bandwidth expansion of an excitation signal during encoding of a cross-talk sound signal, comprising: calculating a high-band mixing factor usable for mixing a low-band excitation signal and a random noise excitation signal to produce the time-domain bandwidth expanded excitation signal.
- A method for time-domain bandwidth expansion of an excitation signal during encoding of a cross-talk sound signal, comprising: calculating (a) a high-band residual signal using the sound signal and (b) a temporal envelope of the high-band residual signal; calculating a high-band voicing factor based on the temporal envelope of the high-band residual signal; calculating a high-band mixing factor usable for mixing a low-band excitation signal and a random noise excitation signal to produce the time-domain bandwidth expanded excitation signal; and estimating gain/shape parameters using the high-band voicing factor.

A device for time-domain bandwidth expansion of an excitation signal during decoding of a cross-talk sound signal, comprising: a decoder of a high-band mixing factor received in a bitstream; and a mixer of a low-band excitation signal and a random noise excitation signal using the high-band mixing factor to produce the time-domain bandwidth expanded excitation signal.

A device for time-domain bandwidth expansion of an excitation signal during encoding of a cross-talk sound signal, comprising: a calculator of (a) a high-band residual signal using the sound signal and (b) a temporal envelope of the high-band residual signal; and a calculator of a high-band voicing factor based on the temporal envelope of the high-band residual signal.

A device for time-domain bandwidth expansion of an excitation signal during encoding of a cross-talk sound signal, comprising: a calculator of a high-band mixing factor usable for mixing a low-band excitation signal and a random noise excitation signal to produce the time-domain bandwidth expanded excitation signal.

A device for time-domain bandwidth expansion of an excitation signal during encoding of a cross-talk sound signal, comprising: a calculator of (a) a high-band residual signal using the sound signal and (b) a temporal envelope of the high-band residual signal; a calculator of a high-band voicing factor based on the temporal envelope of the high-band residual signal; a calculator of a high-band mixing factor usable for mixing a low-band excitation signal and a random noise excitation signal to produce the time-domain bandwidth expanded excitation signal; and an estimator of gain/shape parameters using the high-band voicing factor.

The foregoing and other objects, advantages and features of the method and device for time-domain bandwidth expansion of an excitation signal during encoding/decoding of a cross-talk sound signal will become more apparent upon reading of the following non-restrictive description of illustrative embodiments thereof, given by way of example only with reference to the accompanying drawings.

DESCRIPTION

Figure 1:
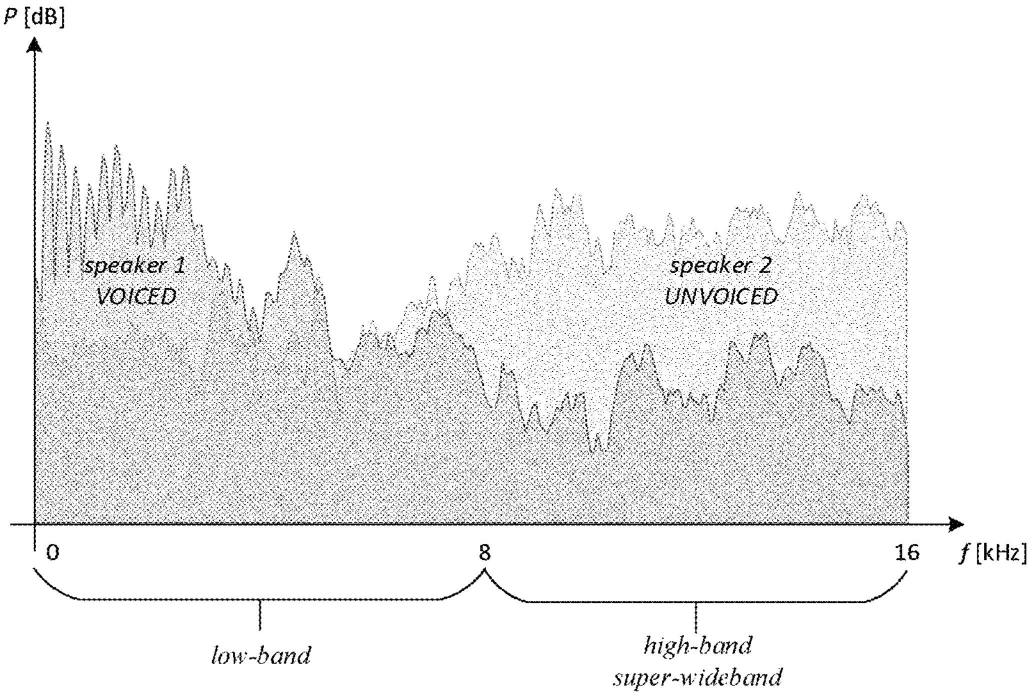
FIG. 1 is a plot showing the power spectrum P (dB) versus frequency f (kHz) of an exemplary cross-talk sound in which two speakers (speaker 1 and speaker 2) pronounce sounds of different types (VOICED and UNVOICED)

The following description relates to a technique for encoding/decoding cross-talk sound signals. In the present disclosure, the basis for the encoding/decoding technique is the SWB TBE tool of the 3GPP EVS codec as described in Reference [1]. However, it should be kept in mind that this technique may be used in conjunction with other encoding/decoding technologies.

More specifically, the present disclosure proposes a series of modifications to the SWB TBE tool. An objective of this series of modifications is to improve the quality of synthesized cross-talk sound signals, such as cross-talk speech signals, in particular but not exclusively to eliminate the above defined rattling noise. The series of modifications is concerned with time-domain bandwidth expansion of an excitation signal and is distributed in one or more of the following three areas:

- In the encoder, calculation of a high-band voicing factor using a temporal envelope of a high-band residual signal. In the SWB TBE tool, high-band corresponds to SHB (Super Higher-Band).
- In the encoder and decoder, calculation of a high-band mixing factor for a high-band excitation signal.
- In the encoder and decoder, improvements in the estimation of gain/shape parameters and frame gain.

Calculation of the high-band voicing factor in accordance with the present disclosure uses a high-band autocorrelation function itself calculated from the temporal envelope of the high-band residual signal for example in the down-sampled domain. The high-band voicing factor is used in the encoder to replace the so-called voice factors derived from the low-band voicing parameter in the SWB TBE tool.

Calculation of the high-band mixing factor in accordance with the present disclosure replaces the corresponding method in the SWB TBE tool. The high-band mixing factor determines a proportion of a low-band excitation signal (for example from an ACELP core) and a random noise (which may also be defined as "white noise") excitation signal for producing the time-domain bandwidth expanded excitation signal. In the disclosed implementation, the high-band mixing factor is calculated by means of MSE (Mean Squared Error) minimization between the temporal envelope of the random noise excitation signal and the temporal envelope of the low-band excitation signal, for example in the down-sampled domain. Quantization of the high-band mixing factor may be performed by the existing quantizer of the SWB TBE tool. The addition of the quantized high-band mixing factor to the SWB TBE bitstream results in a small increase of the bitrate. The mixing operation is performed both at the encoder and the decoder. Other properties of the mixing operation may comprise a re-scaling of the random noise excitation signal at the beginning of each frame and an interpolation of the high-band mixing factor to ensure smooth transitions between the current frame and the previous frame.

Estimation of the gain/shape parameters in accordance with the present disclosure comprises post-processing of the gain/shape parameters using adaptive smoothing of the unquantized gain/shape parameters (in the encoder) by means of weighting between original gain/shape parameters and interpolated gain/shape parameters. Quantization of the gain/shape parameters may be performed by the existing quantizer of the SWB TBE tool. The adaptive smoothing is applied twice; it is first applied to the unquantized gain/shape parameters (in the encoder), and then to the quantized gain/shape parameters (both in the encoder and decoder). An adaptive attenuation is applied to the unquantized frame gain at the encoder. The adaptive attenuation is based on an MSE excess error which is a by-product of the SHB voicing parameter calculation in the SWB TBE tool.

Figure 2:
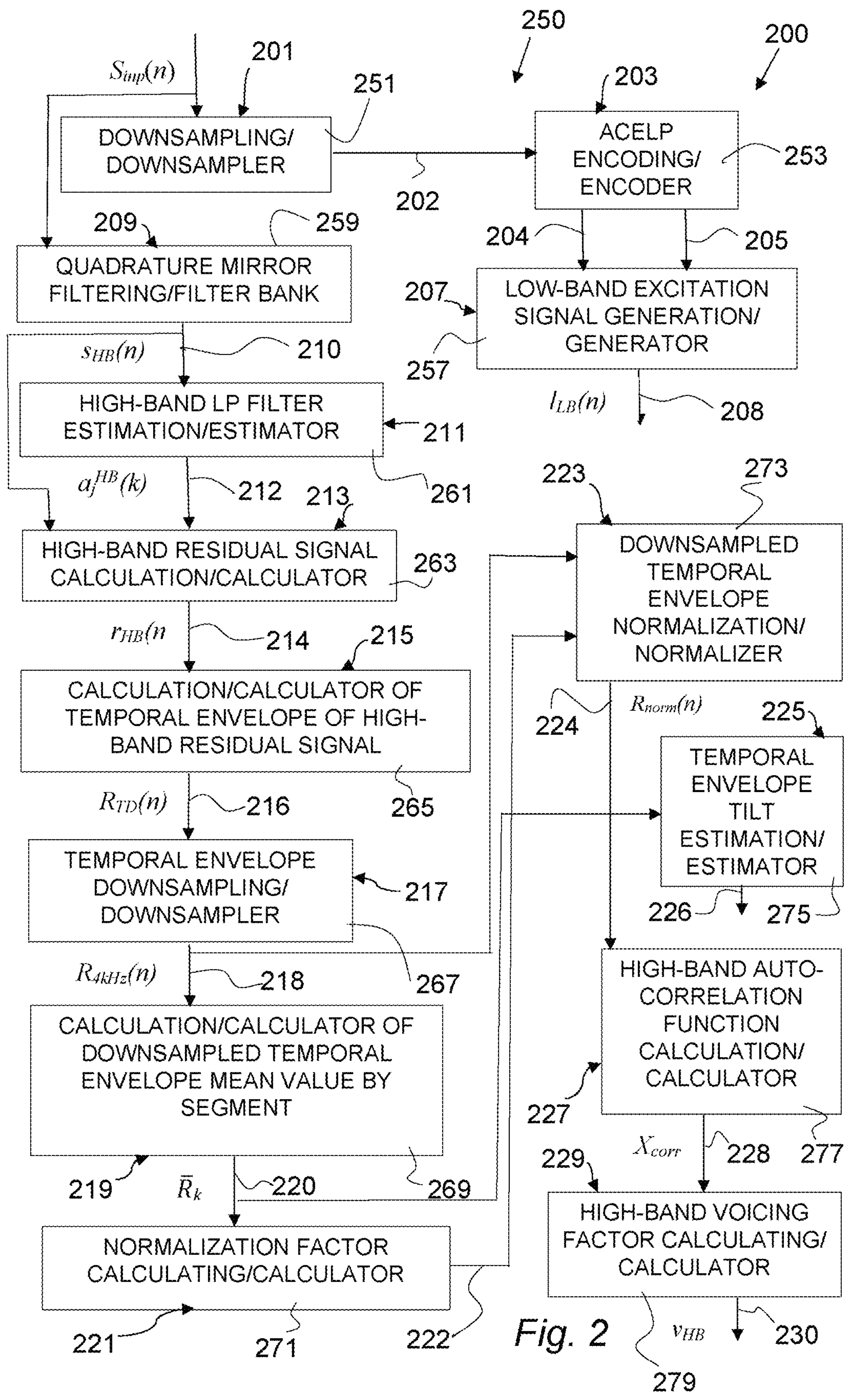
FIG. 2 is a schematic block diagram illustrating concurrently a calculation/calculator of a high-band voicing factor in the method and the device for time-domain bandwidth expansion of an excitation signal during encoding of a cross-talk sound signal.

FIG. 2 is a schematic block diagram illustrating concurrently a calculation/calculator of a high-band voicing factor within the method 200 and the device 250 for time-domain bandwidth expansion of an excitation signal during encoding of a cross-talk sound signal.

1. LOW-BAND EXCITATION SIGNAL

Referring to FIG. 2, the input sound signal $s_{inp}(n)$ to the 3GPP EVS codec is denoted, for example using the following relation (1):

$$s_{inp}(n), \quad n = 0, \ldots, N_{32k} - 1 \tag{1}$$

where $N_{32\,k}$ is the number of samples in the frame (frame length). In this particular non-limitative example, the input sound signal $s_{inp}(n)$ is sampled at the rate of $F_s$=32 kHz and the length of a single frame is $N_{32\,k}$=640 samples. This corresponds to a time interval of 20 ms. Frames of given duration, each including a given number of sub-frames and including a given number of successive sound signal samples, are used for processing sound signals in the field of sound signal encoding; further information about such frames can be found, for example, in Reference [1].

The method 200 comprises a downsampling operation 201 and the device 250 comprises a downsampler 251 for conducting operation 201. The downsampler 251 downsamples the input sound signal $s_{inp}(n)$ from 32 kHz to 12.8 kHz or 16 kHz depending on the bitrate of the encoder. For example, the input sound signal in the 3GPP EVS codec is downsampled to 12.8 kHz for all bitrates up to 24.4 kbps and to 16 kHz otherwise. The resulting signal is a low-band signal 202. The low-band signal 202 is encoded in an ACELP encoding operation 203 using an ACELP encoder 253.

The method 200 comprises the ACELP encoding operation 203 while the device 250 comprises the ACELP encoder 253 of the 3GPP EVS codec to perform the ACELP encoding. The ACELP encoder 253 generates two types of excitation signals, an adaptive codebook excitation signal 204 and a fixed codebook excitation signal 205 as described in Reference [1].

In the method 200 and device 250, the SWB TBE tool within the 3GPP EVS codec performs a low-band excitation signal generating operation 207 and comprises a corresponding generator 257 for generating the low-band excitation signal 208. The generator 257 uses the two excitation signals 204 and 205 as an input, mixes them together and applies a non-linear transformation to produce a mixed signal with flipped spectrum which is further processed in the SWB TBE tool to result into the low-band excitation signal 208 of FIG. 2. Details about low-band excitation signal generation can be found in Reference [1]; specifically Section 5.2.6.1 describes SWB TBE encoding and Section 6.1.3.1 describes SWB TBE decoding.

As a non-limitative example, the low-band excitation signal 208 with flipped spectrum is sampled at 16 kHz and denoted using the following relation (2):

$$l_{LB}(n), \quad n = 0, \ldots, N - 1 \tag{2}$$

where N=320 is the frame length.

2. HIGH-BAND TARGET SIGNAL

Referring to FIG. 2, a high-band target signal 210 is essentially an extract of the input sound signal $s_{inp}(n)$ containing spectral components in the frequency range of 6.4 kHz to 14 kHz or 8 kHz to 16 kHz depending on the bitrate of the codec. The high-band target signal 210 is always sampled at 16 kHz regardless of the bitrate of the codec and its spectral content is flipped. Therefore, the first frequency bin of the high-band target spectrum corresponds to the last frequency bin of the spectrum and vice-versa. In the method 200 and device 250, the high-band target signal 210 may be generated for example using a QMF (Quadrature Mirror Filter) analysis operation 209 performed by the QMF analysis filter bank 259 of the 3GPP EVS codec as described in Reference [1]. Alternatively, the high-band target signal 210 may be generated by filtering the input sound signal $s_{inp}(n)$ with a pass-band filter, shifting it in frequency domain, flipping its spectral content as described above and finally downsampling it from 32 kHz to 16 kHz. In the present disclosure, the use of QMF processing will be assumed and the high-band target signal 210 is denoted, for example using the following relation (3):

$$s_{HB}(n), \quad n = 0, \ldots, N - 1 \tag{3}$$

Following processing in the QMF filter bank 259, the method 200 comprises an operation 211 of estimating high-band filter coefficients 212 and the device 250 comprises an estimator 261 to perform operation 211. The estimator 261 estimates the high-band LP (Linear Prediction) filter coefficients 212 from the high-band target signal 210 in four consecutive subframes by frame where each subframe has the length of 80 samples. The estimator 261 calculates the high-band LP filter coefficients 212 using the Levinson-Durbin algorithm as described in Reference [1]. The high-band LP filter coefficients 212 may be denoted using the following relation (4):

$$a_j^{HB}(k),\quad k=0,\ldots,P,\ j=0,\ldots,3 \tag{4}$$

where P=10 is the order of the high-band LP filter and j=0, . . . , 3 is the subframe index. The first LP filter coefficient in each subframe is unitary, i.e.

$$a_j^{HB}(0)=1.$$

The method 200 comprises an operation 213 of generating a high-band residual signal 214 and the device 250 comprises a generator 263 of the high-band residual signal to conduct operation 213. The generator 263 produces the high-band residual signal 214 by filtering the high-band target signal 210 from the QMF analysis filter bank 259 with the high-band LP filter (LP filter coefficients 212) from estimator 261. The high-band residual signal 214 may be expressed, for example, using the following relation (5):

$$r_{HB}(n+j\cdot 80)=s_{HB}(n+j\cdot 80)-\sum_{k=1}^{P}a_j^{HB}(k)s_{HB}(n+j\cdot 80-k)\qquad j=0,\ldots,3,\ n=0,\ldots,80-1 \tag{5}$$

The first P samples of the high-band residual signal 214 are calculated using the high-band target signal 210 from the previous frame. This is indicated by the negative index in $s_{HB}(-k)$, k=1, . . . , P in the summation term. The negative indices refer to the samples of the high-band target signal 214 at the end of the previous frame.

3. HIGH-BAND AUTOCORRELATION FUNCTION AND VOICING FACTOR

Section 3 (High-Band Autocorrelation Function) relates to features of the encoder.

The high-band residual signal 214 calculated by the generator 263 using relation 5 is used to calculate a high-band autocorrelation function and a high-band voicing factor. The high-band autocorrelation function is not calculated directly on the high-band residual signal 214. Direct calculation of the high-band autocorrelation function requires significant computational resources. Furthermore, the dynamics of the high-band residual signal 214 are generally low and the spectral flipping process often leads to smearing the differences between voiced and unvoiced sound signals. To avoid these problems the high-band autocorrelation function is estimated on the temporal envelope of the high-band residual signal 214 for example in the downsampled domain.

The method 200 comprises an operation 215 of calculating the temporal envelope of the high band residual signal 214 and the device 250 comprises a calculator 265 to perform operation 215. To calculate the temporal envelope $R_{TD}(n)$ 216 of the high-band residual signal 214, the calculator 265 processes the high-band residual signal 214 through a sliding moving-average (MA) filter comprising in the example implementation M=20 taps. The temporal envelope calculation can be expressed, for example by the following relation (6):

$$R_{TD}(n)\frac{1}{M}\sum_{k=-M/2}^{M/2-1}|r_{HB}(n+k)|,\quad n=0,\ldots,N-M-1 \tag{6}$$

where the negative samples $r_{HB}(k)$, k=–M/2, . . . , –1 refer to the values of the high-band residual signal 214 in the previous frame. In mode switching scenarios it may happen that the high-band residual signal 214 in the previous frame is not calculated and the values are unknown. In that case the first M/2 values $r_{HB}(k)$, k=0, . . . , M/2–1 are replicated and used as a replacement for the values $r_{HB}(k)$, k=–M/2, . . . , –1 of the previous frame. The calculator 265 approximates the last M values of the temporal envelope $R_{TD}(n)$ 216 in the current frame by means of IIR (Infinite Impulse Response) filtering. This can be done using the following relation (7):

$$R_{TD}(n)=0.05\cdot r_{HB}(n)+0.95\cdot R_{TD}(n-1),\quad n=N-M,\ldots,N-1 \tag{7}$$

Figure 3:
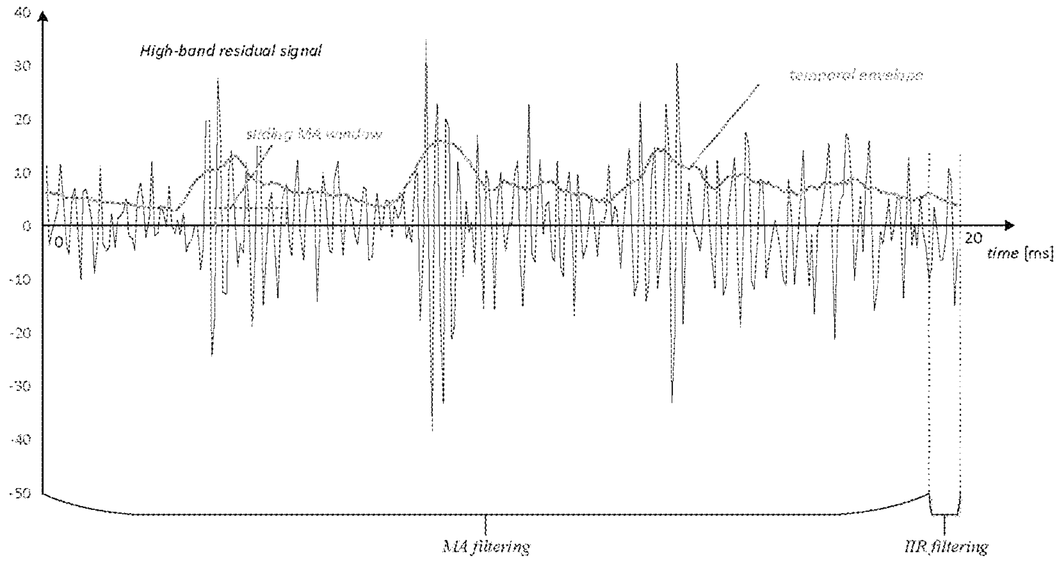
FIG. 3 is a graph illustrating how a temporal envelope of a high-band residual signal is determined.

The operation 215 of calculating the temporal envelope $R_{TD}(n)$ 216 of the high-band residual signal 214 is illustrated in FIG. 3.

The method 200 comprises a temporal envelope downsampling operation 217 and the device 250 comprises a downsampler 267 for conducting operation 217. The downsampler 267 downsamples the temporal envelope $R_{TD}(n)$ 216 by a factor of 4 using, for example, the following relation (8):

$$R_{4kHz}(n)=R_{TD}(4n),\quad n=0,\ldots,N/4-1 \tag{8}$$

The method 200 comprises a mean value calculating operation 219 and the device 250 comprises a calculator 269 for conducting operation 219. The calculator 269 divides the down-sampled temporal envelope $R_{4\,kHz}(n)$ 218 into four consecutive segments and calculates the mean value 220 of the down-sampled temporal envelope $R_{4\,kHz}(n)$ 218 in each segment using, for example, the following relation (9):

$$\overline{R}_k=\frac{1}{N/16}\sum_{n=0}^{N/16-1}R_{4kHz}\left(k\cdot\frac{N}{16}+n\right),\quad k=0,\ldots,3 \tag{9}$$

where k is the index of the segment.

The calculator 269 limits all the mean values to a maximum value of 1.0.

The method 200 comprises a normalization factor calculating operation 221 and the device 250 comprises a calculator 271 for conducting operation 221. The calculator 271 uses the down-sampled temporal envelope mean values 220 to calculate, for the respective segments k, segmental normalization factors using, for example, the following relation (10):

$$\eta_k = \frac{1}{\overline{R}_k} \quad k = 0, \ldots, 3 \tag{10}$$

The calculators 271 then linearly interpolates the segmental normalization factors from relation (10) within the entire interval of the current frame to produce interpolated normalization factors 222 using, for example, the following relation (11):

$$\begin{aligned} &\gamma(n) = \eta_{-1} + n \cdot \frac{\eta_0 - \eta_{-1}}{N/32}, && n = 0, \ldots, N/32 - 1 \\ &\gamma\left(\frac{N}{32} + k \cdot \frac{N}{16} + n\right) = \eta_{k-1} + n \cdot \frac{\eta_k - \eta_{k-1}}{N/16} && k = 0, \ldots, 2,\ n = 0, \ldots, N/16 - 1 \\ &\gamma(n) = \eta_3, && n = 7N/32, \ldots, N/4 - 1 \end{aligned} \tag{11}$$

Figure 4:
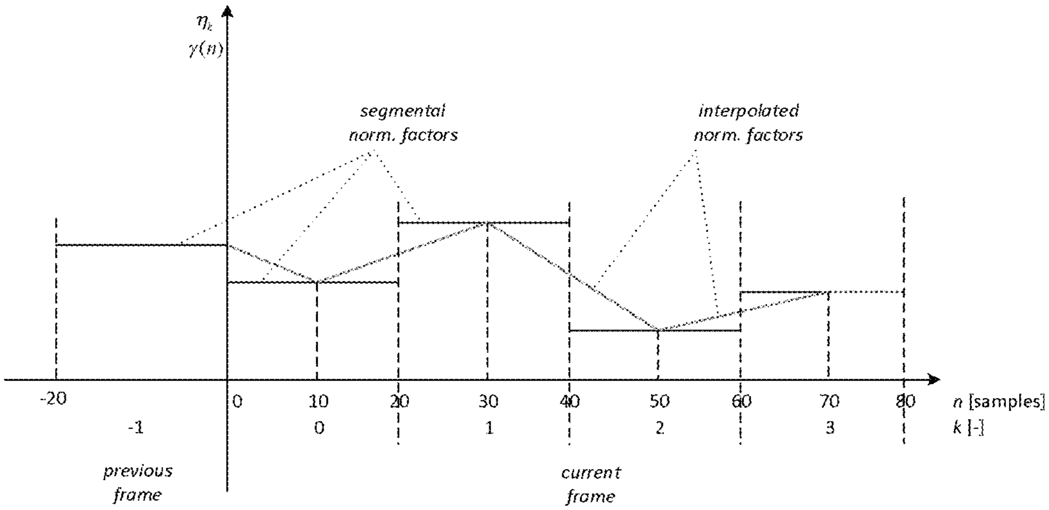
FIG. 4 is a graph showing interpolation of segmental normalization factors calculated using mean values of consecutive segments of the down-sampled temporal envelope of the high-band residual signal.

This interpolation process performed by operation 221 and calculator 271 is illustrated in FIG. 4.

In relation (11), the term $\eta_{-1}$ refers to the last segmental normalization factor in the previous frame. Therefore, $\eta_{-1}$ is updated with $\eta_3$ after the interpolation process in each frame.

The method 200 comprises a downsampled temporal envelope normalizing operation 223 and the device 250 comprises a normalizer 273 for conducting operation 223. The normalizer 273 processes the down-sampled temporal envelope $R_{4\ kHz}(n)$ 218 from the downsampler 267 with the interpolated normalization factors $\gamma(n)$ 222 using, for example, the following relation (12):

$$R_\gamma(n) = R_{4kHz}(n) \cdot \gamma(n), \quad n = 0, \ldots, N/4 - 1 \tag{12}$$

The normalizer 273 then subtracts the global mean value $\overline{R_\gamma}$ (relation (13)) of the normalized envelope from the value $R_\gamma(n)$ of relation (12) to complete the downsampled temporal envelope normalization process ($R_{norm}(n)$ 224 of FIG. 2) in operation 223. This can be expressed by relation (13):

$$\overline{R_\gamma} = \frac{1}{N/4} \sum_{n=0}^{N/4-1} R_\gamma(n) \tag{13}$$

$$R_{norm}(n) = R_\gamma(n) - \overline{R_\gamma}, \quad n =, \ldots, N/4 - 1$$

It is useful to estimate the tilt of the temporal envelope of the high-band residual signal. For that purpose, the method 200 comprises a temporal envelope tilt estimation operation 225 and the device 250 comprises an estimator 275 for conducting operation 225. The temporal envelope tilt estimation can be done by fitting a linear curve to the segmental mean values $\overline{R_k}$ calculated in relation (9) with the linear least squares (LLS) method. The tilt 226 of the temporal envelope is then the slope of the linear curve. The linear curve calculated with the LLS method is defined as:

$$y_k^{[LLS]} = a \cdot k + b, \quad k = 0, \ldots, 3 \tag{14}$$

According to the LLS method, the objective is to minimize the sum of squared differences between $$\overline{R_k} \text{ and } y_k^{[LLS]}$$

for all k=0, . . . , 3. This can be expressed using the following relation (15):

$$(a_{LLS}, b_{LLS}) = \min_{a,b}\left[\sum_{k=0}^{3}\left(\overline{R}_k - y_k^{[LLS]}\right)^2\right] \tag{15}$$

The optimal slope $a_{LLS}$ (tilt 226) can be calculated by the estimator 275 using relation (16):

$$a_{LLS} = \frac{4\sum_{k=0}^{3} k \cdot \overline{R}_k - 6\sum_{k=0}^{3} \overline{R}_k}{4 \cdot 14 - 6 \cdot 6} = \frac{1}{5}\sum_{k=0}^{3} k \cdot \overline{R}_k - \frac{3}{10}\sum_{k=0}^{3} \overline{R}_k \tag{16}$$

The method 200 comprises a high-band autocorrelation function calculating operation 227 and the device 250 comprises a calculator 277 for conducting operation 227. The calculator 277 calculates the high-band autocorrelation function $X_{corr}$ 228 based on the normalized temporal envelope using, for example, relation (17):

$$X_{corr}(k - 40) = \frac{1}{\max\left(E_f, E_f^{[-1]}\right)} \sum_{n=0}^{N/4-1} R_{norm}(n) R_{norm}(n - k), \quad k = 40, \ldots, 80 - 1 \tag{17}$$

where $E_f$ is the energy of the normalized temporal envelope $R_{norm}(n)$ 224 in the current frame and $$E_f^{[-1]}$$

is the energy of the normalized temporal envelope $R_{norm}(n)$ 224 in the previous frame. The calculator 277 may use the following relation (18) to calculate the energy:

$$E_f = \sum_{n=0}^{N/4-1} (R_{norm}(n))^2 + 1.0 \tag{18}$$

In case of mode switching the factor in front of the summation term in relation (17) is set to $1/E_f$ because the energy of the normalized temporal envelope $R_{norm}(n)$ 224 in the previous frame is unknown.

The method 200 comprises a high-band voicing factor calculating operation 229 and the device 250 comprises a calculator 279 for conducting operation 229.

The voicing of the high-band residual signal is closely related to the variance $\sigma_{corr}$ of the high-band autocorrelation function $X_{corr}$ 228. The calculator 279 calculates the variance $\sigma_{corr}$ using, for example, the following relation (19):

$$\sigma_{corr} = \frac{1}{40}\sum_{k=0}^{40-1}(X_{corr}(k))^2 \qquad (19)$$

To improve the discriminative potential (VOICED/UNVOICED decision) of the voicing parameter $v_{mult}$, the calculator 279 multiplies the variance $\sigma_{corr}$ with the maximum value of the high-band autocorrelation function $X_{corr}$ 228 as expressed in the following relation (20):

$$v_{mult} = \sigma_{corr} \cdot \max_k(X_{corr}(k)) \qquad (20)$$

The calculator 279 then transforms the voicing parameter $v_{mult}$ from relation (20) with the sigmoid function to limit its dynamic range and obtain a high-band voicing factor $v_{HB}$ 230 using, for example, the following relation (21):

$$v_{HB} = \frac{2.0}{1.0 + \exp(-\beta \cdot v_{mult})} - 1.0 \qquad (21)$$

where the factor $\beta$ is estimated experimentally and set, for example, to a constant value of 25.0. The high-band voicing factor $v_{HB}$ 230 as calculated from relation (21) above is then limited to the range of $\langle 0.0; 1.0 \rangle$ and transmitted to the decoder.

4. EXCITATION MIXING FACTOR

Figure 5:
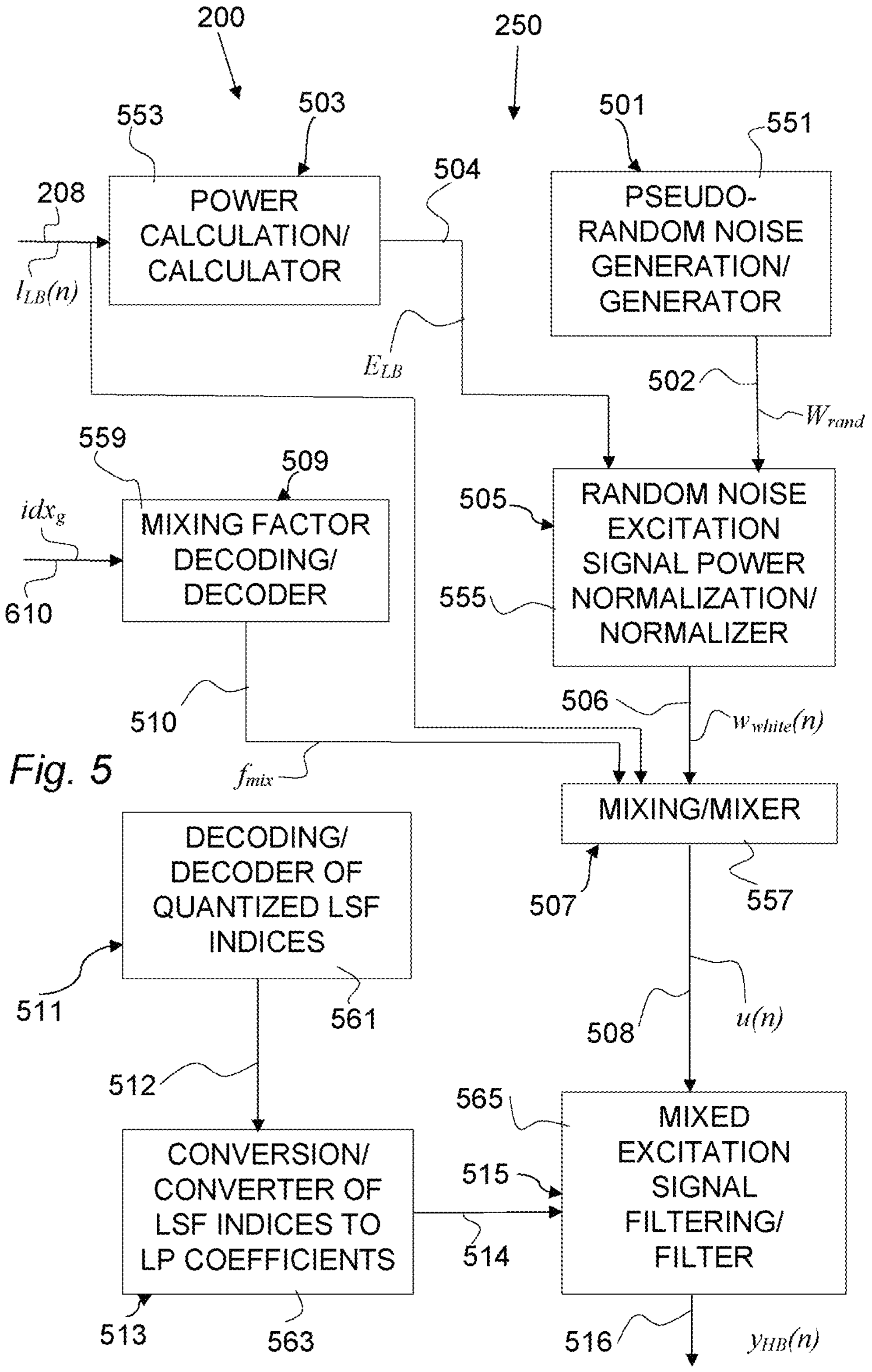
FIG. 5 is a schematic block diagram illustrating concurrently, at the decoder, a calculation/calculator of a time-domain bandwidth expanded excitation signal within the method and the device for time-domain bandwidth expansion of an excitation signal.

FIG. 5 is a schematic block diagram illustrating concurrently, at the decoder, a calculation/calculator of a time-domain bandwidth expanded excitation signal within the method 200 and the device 250.

Section 4 (Excitation Mixing Factor) relates to features of both the encoder and decoder.

The SWB TBE tool in the 3GPP EVS codec uses the low-band excitation signal 208 (FIG. 2) described in Section 1 (Low-Band Excitation Signal) to predict the high-band residual signal 214 (FIG. 2) described in Section 2 (High-Band Target Signal). At lower bitrates of the EVS codec, below 24.4 kbps, the SWB TBE tool uses 19 bits to encode the spectral envelope and the energy of the predicted high-band residual signal. With a frame length of 20 ms this results in a bitrate of 0.95 kbps. At bitrates higher than 24.4 kbps the SWB TBE tool uses 32 bits to encode the spectral envelope and the energy of the predicted high-band residual signal. With a frame length of 20 ms this results in a bitrate of 1.6 kbps. At both bitrates (0.95 and 1.6 kbps) of the SWB TBE tool no bits are used to encode the high-band residual signal 214 or the high-band target signal 210.

Referring to FIG. 5, the method 200 comprises a pseudo-random noise generating operation 501 and the device 250 comprises a pseudo-random noise generator 551 to perform operation 501.

The pseudo-random noise generator 551 produces a random noise excitation signal 502 with uniform distribution. For example, the generator of pseudo-random numbers of the 3GPP EVS codec as described in Reference [1] can be used as pseudo-random noise generator 551. The random noise excitation signal $w_{rand}$ 502 can be expressed using the following relation (22):

$$w_{rand}(n) \in U[-32767; 32768], \quad n = 0, \ldots, N-1 \qquad (22)$$

The random noise excitation signal $w_{rand}$ 502 has zero mean and a non-zero variance $\sigma_{rand}$=1.14e+11. It should be noted that the variance is only approximate and represents an average value over 100 frames.

The method 200 comprises an operation 503 of calculating the power of the low-band excitation signal $l_{LB}(n)$ 208 and a power calculator 553 to perform operation 503.

The power calculator 503 calculates that power 504 of the low-band excitation signal $l_{LB}(n)$ 208 transmitted from the encoder using, for example, the following relation (23):

$$E_{LB} = \sum_{n=0}^{N-1}(l_{LB}(n))^2 \qquad (23)$$

The method 200 comprises an operation 505 of normalizing the power of the random noise excitation signal 502 and a power normalizer 555 to perform operation 505.

The power normalizer 555 normalizes the power of the random noise excitation signal 502 to the power 504 of the low-band excitation signal 208 using, for example, the following relation (24):

$$w_{whtie}(n) = \sqrt{\frac{E_{LB}}{\sigma_{rand}}} \cdot w_{rand}(n), \quad n = 0, \ldots, N-1 \qquad (24)$$

Although the true variance of the random noise excitation signal 502 varies from frame to frame, the exact value is not needed for power normalization. Instead, the above defined approximate value of the variance is used in the above relation (24) to save computational resources.

The method 200 comprises an operation 507 of mixing the low-band excitation signal $l_{LB}(n)$ 208 with the power normalized random noise excitation signal $w_{white}(n)$ 506 and a mixer 557 to perform operation 507.

The mixer 557 produces the time-domain bandwidth expanded excitation signal 508 by mixing the low-band excitation signal $l_{LB}(n)$ 208 with the power normalized random noise excitation signal $w_{white}(n)$ 506 using a high-band mixing factor to be described later in the present disclosure.

Figure 6:
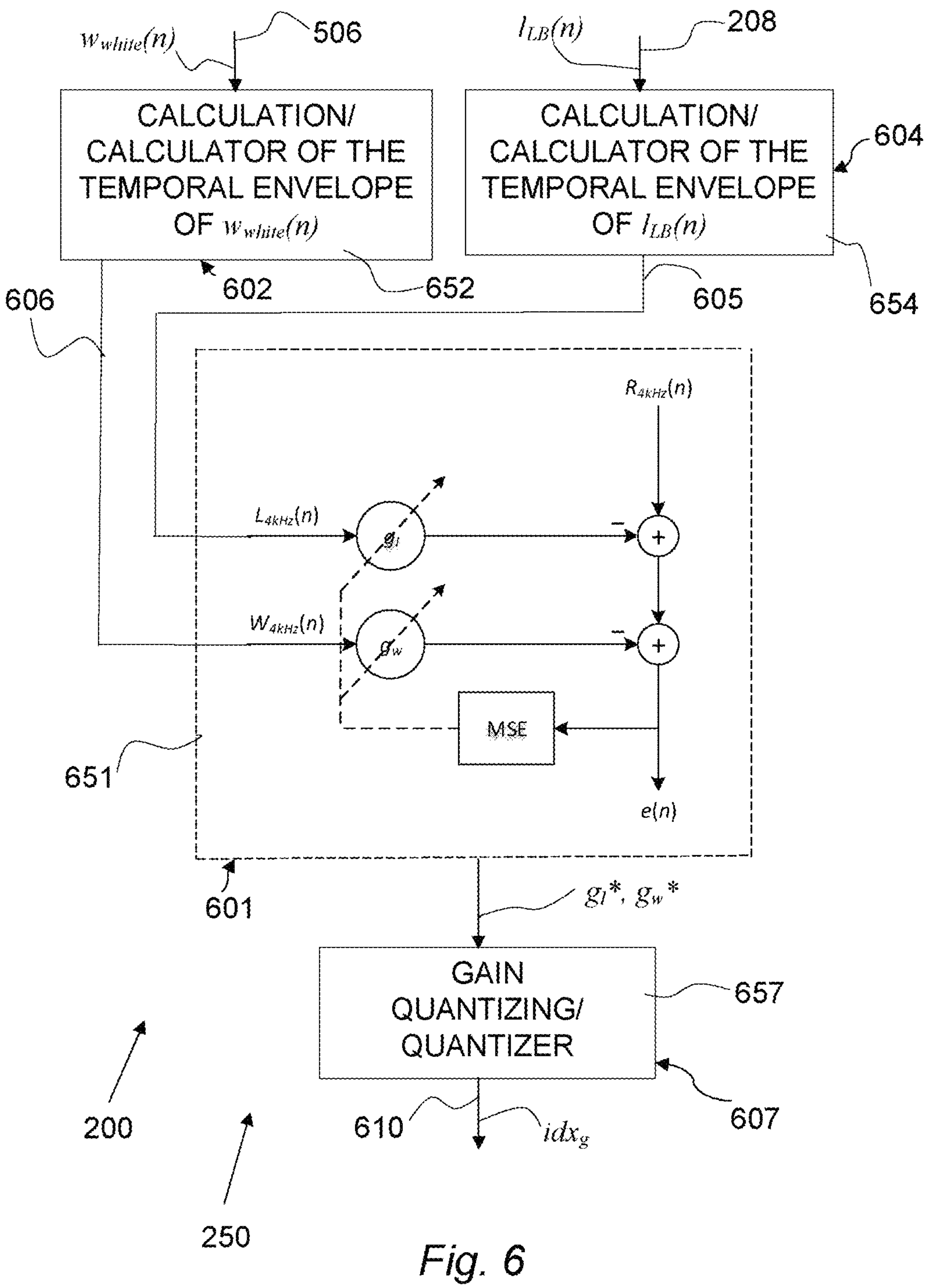
FIG. 6 is a schematic block diagram illustrating concurrently, at the encoder, a calculation/calculator of a high-band mixing factor formed/represented by a quantized normalized gain within the method and the device for time-domain bandwidth expansion of an excitation signal.

FIG. 6 is a schematic block diagram illustrating concurrently, at the encoder, a calculation/calculator of a high-band mixing factor formed/represented by a quantized normalized gain within the method and the device for time-domain bandwidth expansion of an excitation signal.

Referring to FIG. 6, at the encoder, the method 200 comprises an operation 602 of calculating the temporal envelope of the power-normalized random noise excitation signal $w_{white}(n)$ 506, an operation 604 of calculating the temporal envelope of the low-band excitation signal $l_{LB}(n)$ 208, and a mean squared error (MSE) minimizing operation 601, and a gain quantizing operation 607; and the device 250 comprises a temporal envelope calculator 652 to perform operation 602, a temporal envelope calculator 654 to perform operation 604, an MSE minimizer 651 to perform operation 601, and a gain quantizer 657 to perform operation 607.

As illustrated in FIG. 6, to save computational resources, optimal gains $$g_l^*, g_w^*$$

are calculated based on the temporal envelopes of the signals in the downsampled domain using a mean squared error (MSE) minimization process. Another advantage of this approach is higher robustness against background noise.

The calculator 652 calculates the downsampled temporal envelope $W_{4\ kHz}(n)$ 606 of the power-normalized random noise excitation signal $w_{white}(n)$ 506 (which is also calculated at the encoder as shown in FIG. 5 and corresponding description) using the same algorithm as described in Section 3 (High-Band Autocorrelation Function and Voicing Factor) upon calculating (operation 215 and calculator 265 of FIG. 2) the temporal envelope of the high-band residual signal 214 and downsampling (operation 217 and downsampler 267 of FIG. 2) the temporal envelope. The downsampling factor being used is, for example, 4. The downsampled temporal envelope of the power-normalized random noise excitation signal can be denoted using the following relation (25):

$$W_{4kHz}(n),\quad n = 0, \ldots, N/4-1 \tag{25}$$

Similarly, the calculator 654 calculates temporal envelope $L_{4\ kHz}(n)$ 605 of the low-band excitation signal $l_{LB}(n)$ 208 downsampled at 4 kHz again using the same algorithm as described in Section 3 (High-Band Autocorrelation Function and Voicing Factor). The downsampled temporal envelope 606 of the low-band excitation signal $l_{LB}(n)$ 208 can be denoted as follows:

$$L_{4kHz}(n),\quad n = 0, \ldots, N/4-1 \tag{26}$$

The objective of the MSE minimization operation 601 is to find an optimal pair of gains $$g_l^*, g_w^*$$

minimizing the energy of the error between (a) the combined temporal envelope ($L_{4\ kHz}(n)$, $W_{4\ kHz}(n)$) and (b) the temporal envelope $R_{4\ kHz}(n)$ of the high-band residual signal $r_{HB}(n)$ 214. This can be mathematically expressed using relation (27):

$$(g_l^*, g_w^*) = \min_{g_l, g_w}\left[\sum_{n=0}^{N/4-1}(R_{4kHz} - g_l \cdot L_{4kHz}(n) - g_w \cdot W_{4kHz}(n))^2\right] \tag{27}$$

For that purpose, the MSE minimizer 651 solves a system of linear equations. The solution is found in the scientific literature. For example, the optimal pair of gains $$g_l^*, g_w^*$$

can be calculated using relation (28):

$$D = 4.0 \cdot c_0 \cdot c_2 - c_4 \cdot c_4 \tag{28}$$

$$g_l^* = \frac{c_3 \cdot c_4 - 2.0 \cdot c_1 \cdot c_2}{D}$$

$$g_w^* = \frac{c_1 \cdot c_4 - 2.0 \cdot c_0 \cdot c_3}{D}$$

where the values $c_0, \ldots, c_4$, and $c_5$ are given by $$c_0 = \sum_{n=0}^{N/4-1}(L_{4kHz}(n))^2,\ c_1 = -2.0\sum_{n=0}^{N/4-1}L_{4kHz}(n)\cdot R_{4kHz}(n),\ c_2 = \sum_{n=0}^{N/4-1}(W_{4kHz}(n))^2 \tag{29}$$

$$c_3 = -2.0\sum_{n=0}^{N/4-1}R_{4kHz}(n)\cdot W_{4kHz}(n),\ c_4 = 2.0\sum_{n=0}^{N/4-1}L_{4kHz}(n)\cdot W_{4kHz}(n),\ c_5 = \sum_{n=0}^{N/4-1}(R_{4kHz}(n))$$

The MSE minimizer 651 then calculates the minimum MSE error energy (excess error) using, for example, the following relation (30):

$$E_{err} = (g_l^*)^2 + c_0 + g_l^* c_1 + (g_w^*)^2 + c_2 + g_w^* c_3 + g_l^* g_w^* c_4 + c_5 \tag{30}$$

For further processing, the gain quantizer 657 scales the optimal gains $$g_l^*, g_w^*$$

in such a way that a gain $g_{ln}$ associated with the temporal envelope $L_{4\ kHz}(n)$ 605 of the low-band excitation signal $l_{LB}(n)$ becomes unitary, with a gain $g_{wn}$ associated with the temporal envelope $W_{4\ kHz}(n)$ 606 of the power-normalized random noise excitation signal $w_{white}(n)$ 506 given using, for example the following relation (31):

$$g_{ln} = 1.0 \qquad (31)$$

$$g_{wn} = \frac{g_w^*}{g_l^* + g_w^*}$$

The result/advantage of the re-scaling of relation (31) is that only one parameter, the normalized gain $g_{wn}$, needs to be coded and transmitted in the bitstream from the encoder to the decoder instead of two parameters. Therefore, scaling of the gains using relation (31) reduces bit consumption and simplifies the quantization process. On the other hand, the energy of the combined temporal envelopes ($L_{4\ kHz}(n)$ and $W_{4\ kHz}(n)$) will not match the energy of the temporal envelope $R_{4\ kHz}(n)$ of the high-band residual signal 214. This is not a problem since the SWB TBE tool uses subframe gains and a global gain containing the information about energy of the high-band residual signal. The calculation of subframe gains and the global gain is described in Section 6 (Gain/Shape Estimation) of the present disclosure.

The gain quantizer 657 limits the normalized gain $g_{wn}$ between a maximum threshold of 1.0 and a minimum threshold of 0.0. The gain quantizer 657 quantizes the normalized gain $g_{wn}$ using, for example, a 3-bit uniform scalar quantizer described by the following relation (32):

$$idx_g = \left\lfloor \frac{g_{wn}}{1/7} + 0.5 \right\rfloor \qquad (32)$$

and the resulting index $idx_g$ 610 is limited to the interval <0; 7> to form/represent the high-band mixing factor and is transmitted in the SWB TBE bitstream together with the existing indices of the SWB TBE encoder at 0.95 kbps or 1.6 kbps.

Referring back to FIG. 5, the method 200 comprises, at the decoder, a mixing factor decoding operation 509, and the device 250 comprises a mixing factor decoder 559 to perform operation 509.

The mixing factor decoder 559 produces from the received index $idx_g$ 610 a decoded gain using, for example, the following relation (33):

$$f_{mix} = \frac{idx_g}{7} \qquad (33)$$

The decoded gain from relation (33) forms the high-band mixing factor $f_{mix}$ 510.

The low-band excitation signal $l_{LB}(n)$ 208, sampled for example at 16 kHz, and the normalized random noise excitation signal $w_{white}(n)$ 506, sampled for example at 16 kHz, are mixed together in the mixer 557. However, both the energy of the low-band excitation signal $l_{LB}(n)$ 208 and the energy of the random noise excitation signal $w_{rand}$ 502 vary from frame to frame. The fluctuation of energy could eventually generate audible artifacts at frame borders if the low-band excitation signal ID (n) 208 and the random noise excitation signal $w_{rand}$ 502 were mixed directly using the high-band mixing factor $f_{mix}$ 510 obtained from relation (33). To ensure smooth transitions the energy of the random noise excitation signal $w_{rand}$ 502 is linearly interpolated in generator 551 between the previous frame and the current frame. This can be done by scaling the random noise excitation signal $w_{rand}$ 502 in the first half of the current frame with the following interpolation factor:

$$\zeta_w(n) = \sqrt{\frac{E_{LB}^{[-1]}}{E_{LB}}} + n\frac{1.0 - \sqrt{\frac{E_{LB}^{[1]}}{E_{LB}}}}{N/2}, \quad n = 0, \ldots, N/2-1 \qquad (34)$$

where $E_{LB}$ is the energy of the low-band excitation signal $l_{LB}(n)$ 208 in the current frame and $$E_{LB}^{[-1]}$$

is the energy of the low-band excitation signal $l_{LB}(n)$ 208 in the previous frame.

To further smooth the transitions between the previous and the current frame the decoder 559 also linearly interpolates the high-band mixing factor $f_{mix}$ 510. This can be done by introducing the scaling factor $\beta_{mix}(n)$ calculated, for example, using the following relation:

$$\beta_{mix}(n) = f_{mix}^{[-1]} + n \cdot \frac{f_{mix} - f_{mix}^{[-1]}}{N/2}, \quad n = 0, \ldots, N/2-1 \qquad (35)$$

where $$f_{mix}^{[-1]}$$

is the value of the high-band mixing factor in the previous frame. Note that the interpolation factor $\zeta_w(n)$ calculated in relation (34) and the scaling factor $\beta_{mix}(n)$ calculated in relation (35) are defined for n=0, . . . , N/2−1.

The mixing of the low-band excitation signal $l_{LB}(n)$ 208 and the random noise excitation signal $w_{white}(n)$ 506 is finally done by the mixer 557 using, for example, relation (36) to obtain a time-domain bandwidth expanded excitation signal u(n) 508.

$$u(n) = \beta_{mix}(n)\cdot\zeta_w(n)\cdot l_{LB}(n) + (1-\beta_{mix}(n))\cdot w_{white}(n), \quad n = 0, \ldots, N/2-1 \qquad (36)$$

$$u(n) = f_{mix}\cdot(n)\cdot l_{LB}(n) + (1-f_{mix})\cdot w_{white}(n), \quad n = N/2, \ldots, N-1$$

5. HIGH-BAND SYNTHESIS (LP SYNTHESIS)

The high-band LP filter coefficients $$a_j^{HB}(n)$$

212 calculated by means of the LP analysis on the high-band input signal $s_{HB}(n)$ in relation (4) are converted in the encoder of the SWB TBE tool into LSF parameters and quantized. At the bitrate of 0.95 kbps the SWB TBE encoder uses 8 bits to quantize the LSF indices. At the bitrate of 1.6 kbps the SWB TBE encoder uses 21 bits to quantize the LSF indices.

Referring back to FIG. 5, at the decoder:

The method 200 comprises a decoding operation 511 and the device 250 comprises a corresponding decoder 561 to decode the quantized LSF indices; and The method 200 comprises a conversion operation 513 and the device 250 comprises a corresponding converter 563 to convert the decoded LSF indices 512 into high-band LP filter coefficients 514.

The decoded high-band LP filter coefficients 512 can be denoted as:

$$a_{qj}^{HB}(k), \quad k = 0, \ldots, P, \; j = 0, \ldots, 3 \tag{37}$$

where P=10 is the order of the LP filter. The first decoded LP filter coefficient in each subframe is unitary, i.e.

$$a_{qj}^{HB}(0) = 1.0, \; j = 0, \ldots, 3.$$

The method 200 comprises a filtering operation 515 and the device 250 comprises a corresponding synthesis filter 565 using the decoded high-band LP filter coefficients 514 to filter the mixed time-domain bandwidth expanded excitation signal 508 of relation (36) using for example the following relation (38) to obtain a LP-filtered high-band signal $y_{HB}$ 516:

$$y_{HB}(n + j \cdot 80) = u(n + j \cdot 80) - \sum_{k=1}^{P} a_{qj}^{HB}(k) y_{HB}(n + j \cdot 80 - k) \quad j = 0, \ldots, 3, \; n = 0, \ldots, 80 - 1 \tag{38}$$

6. GAIN/SHAPE ESTIMATION (FIG. 7)

A gain/shape parameter smoothing is applied both at the encoder and at the decoder. The adaptive attenuation of the frame gain is applied at the encoder only.

Figure 7:
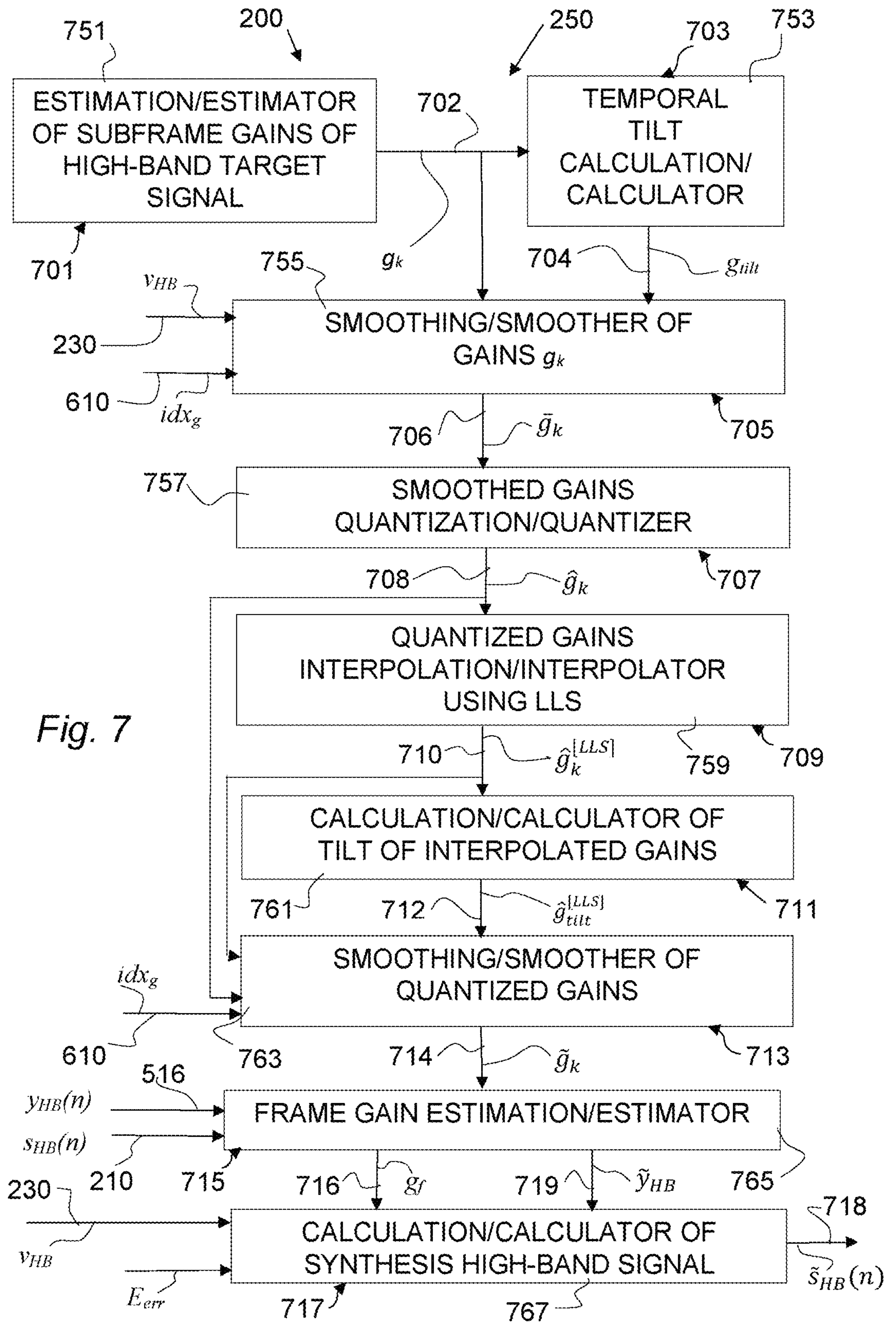
FIG. 7 is a schematic block diagram of gain-shape estimation/estimator within the method and device for time-domain bandwidth expansion of an excitation signal.

The spectral shape of the high-band target signal $s_{HB}(n)$ 210 is encoded with the quantized LSF coefficients. Referring to FIG. 7, the SWB TBE tool also comprises an estimation operation 701/estimator 751 for estimating temporal subframe gains 702 of the high-band target signal $s_{HB}(n)$ 210 as described in Reference [1]. The estimator 751 normalizes the estimated temporal subframe gains to unit energy.

The normalized estimated temporal subframe gains 702 from estimator 751 can be denoted using relation (39):

$$g_k, \; k = 0, \ldots, 3 \tag{39}$$

Figure 8:
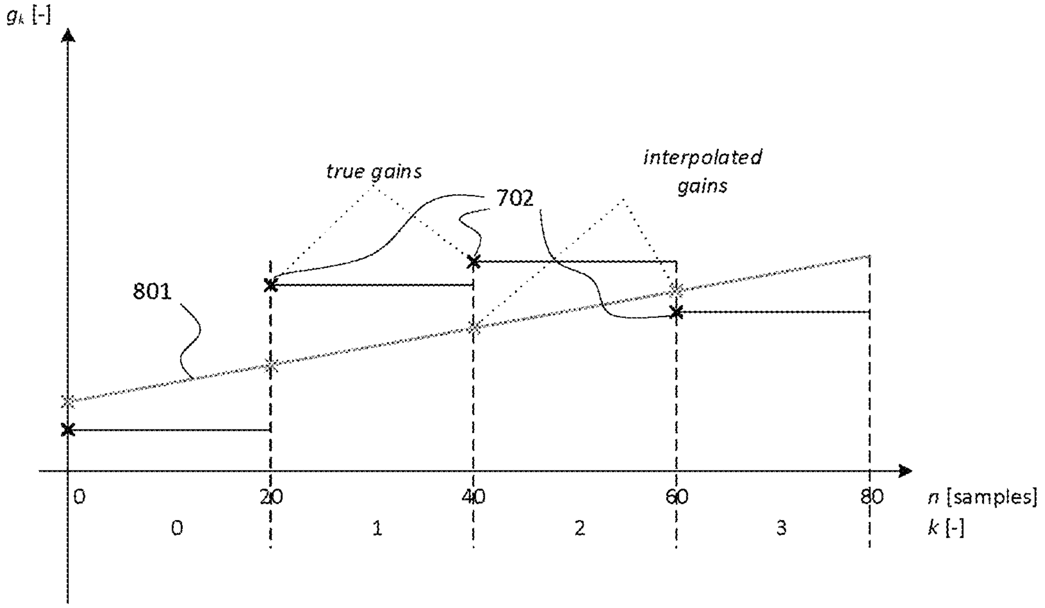
FIG. 8 is a graph illustrating interpolation of subframe gains.

The method 200 comprises a calculating operation 703 and the device 250 comprise a corresponding calculator 753 for determining a temporal tilt 704 of the normalized estimated temporal subframe gains $g_k$ 702 by means of linear least squares (LLS) interpolation. As illustrated in FIG. 8, this interpolation process can be done by fitting a linear curve 801 to the true subframe gains 702 in four consecutive subframes (subframes 0-3 in FIG. 8) and calculating its slope.

The linear curve 801 built with the LLS interpolation method can be defined using the following relation (40):

$$g_k^{[LLS]} = c_{LLS} \cdot k + d_{LLS}, \quad k = 0, \ldots, 3 \tag{40}$$

where the parameters $c_{LLS}$ and $d_{LLS}$ are found by minimizing the sum of squared differences between the true subframe gains $g_k$ 702 and the corresponding points on the linear curve for all k=0, . . . , 3 subframes. This can be expressed using the following relation (41):

$$(c_{LLS}, d_{LLS}) = \min_{c,d} \left[ \sum_{k=0}^{3} \left( g_k - g_k^{[LLS]} \right)^2 \right] \tag{41}$$

By expanding relation (41) it is possible to express the temporal tilt $g_{tilt}$ of the estimated temporal subframe gains $g_k$ 702. The temporal tilt $g_{tilt}$ 702 is, in fact, equal to the optimal slope $c_{LLS}$ of the linear curve. The temporal $g_{tilt}$ guilt can be calculated in the calculator 753 using the following relation (42):

$$g_{tilt} = c_{LLS} = \frac{4\sum_{k=0}^{3} k \cdot g_k - 6\sum_{k=0}^{3} g_k}{4 \cdot 14 - 6 \cdot 6} = \frac{1}{5}\sum_{k=0}^{3} k \cdot g_k - \frac{3}{10}\sum_{k=0}^{3} g_k \tag{42}$$

The method 200 comprises a smoothing operation 705 and the device 250 comprises a corresponding smoother 755 for smoothing the temporal subframe gains $g_k$ 702 with the interpolated (LLS) gains $$g_k^{[LLS]}$$

from relation (40) when, for example, the following condition is true:

$$v_{HB} < 0.4 \quad \text{AND} \quad idx_g \geq 5 \quad \text{AND} \quad |g_{tilt}| < 0.2 \tag{43}$$

The smoothing of the temporal subframe gains $g_k$ 702 is then done by the smoother 755 using, for example, the following relation (44):

$$\bar{g}_k = (1-\kappa)g_k + \kappa \cdot g_k^{[LLS]}, \quad k = 0, \ldots, 3 \tag{44}$$

where the weight κ is proportional to the voicing parameter $v_{HB}$ 230 (FIG. 2) given by relation (21). For example, the weight κ may be calculated using the following relation (45):

$$\kappa = \frac{-0.95}{0.4}(v_{HB} - 0.4) \tag{45}$$

and limited to a maximum value of 1.0 and a minimum value of 0.0.

The method 200 comprises a gain-shape quantizing operation 707 and the device 250 comprises a corresponding gain-shape quantizer 757 for quantizing the smoothed temporal subframe gains $\bar{g}_k$ 706. For that purpose, the gain-shape quantizer of the encoder of the SWB TBE tool as described in Reference [1] using, for example 5 bits, can be used as the quantizer 757. The quantized temporal subframe gains $\hat{g}_k$ 708 from the quantizer 757 can be denoted using the following relation (46):

$$\hat{g}_k, k = 0, \ldots, 3 \tag{46}$$

The method 200 comprises an interpolation operation 709 and the device 250 comprises a corresponding interpolator 759 for interpolating, after the quantization operation 707, the quantized temporal subframe gains $\hat{g}_k$ 708 again using the same LLS interpolation procedure as described in relations (40) and (41). The interpolated quantized subframe gains 710 in the four consecutive subframes in a frame can be denoted using the following relation (47):

$$\hat{g}_k^{[LLS]}, k = 0, \ldots, 3 \tag{47}$$

The method 200 comprises a tilt calculation operation 711 and the device 250 comprises a corresponding tilt calculator 761 for calculating the tilt of the interpolated quantized temporal subframe gains $$\hat{g}_k^{[LLS]}$$

710 using, for example, relation (42). The tilt of the interpolated quantized temporal subframe gains $$\hat{g}_k^{[LLS]}$$

710 can be denoted as $$\hat{g}_{tilt}^{[LLS]}.$$

The quantized temporal subframe gains $\hat{g}_k$ 708 are then smoothed when the condition of the following condition (48) is true, where $idx_g$ is the index from relation (32):

$$idx_g \geq 6 \quad \text{AND} \quad |\hat{g}_{tilt}^{[LLS]}| < 0.12 \tag{48}$$

For that purpose, the method 200 comprises a quantized gains smoothing operation 713 and the device 250 comprises a corresponding smoother 714 for smoothing the quantized temporal subframe gains $\hat{g}_k$ 708 by means of averaging using, for example, the interpolated temporal subframe gains $$\hat{g}_k^{[LLS]}$$

710 from relation (47). For that purpose, the following relation (49) can be used:

$$\tilde{g}_k = 0.7 \cdot \hat{g}_k + 0.3 \cdot \hat{g}_k^{[LLS]}, \quad k = 0, \ldots, 3 \tag{49}$$

The method 200 comprises a frame gain estimating operation 715 and the device 250 comprises a corresponding frame gain estimator 765. The SWB TBE tool uses the frame gain to control the global energy of the synthesized high-band sound signal. The frame gain is estimated by means of energy-matching between (a) the LP-filtered high-band signal $y_{HB}$ 516 of relation (38) multiplied by the smoothed quantized temporal subframe gains $\tilde{g}_k$ 714 from relation (49) and (b) the high-band target signal $s_{HB}(n)$ 210 of relation (3). The LP-filtered high-band signal $y_{HB}$ 516 of relation (38) is multiplied by the smoothed quantized temporal subframe gains $\tilde{g}_k$ 714 using, for example, the following relation (50):

$$\tilde{y}_{HB}(n + k\cdot 80) = \tilde{g}_k \cdot y_{HB}(n + k\cdot 80), \quad k = 0, \ldots, 3, \quad n = 0, \ldots, 80-1 \tag{50}$$

The details of the frame gain estimation operation 715 are described in Reference [1]. The estimated frame gain parameter is denoted as $g_f$ (see 716).

The method 200 comprises an operation 717 of calculating a synthesis high-band signal 718 and the device 250 comprises a calculator 767 for performing the operation 717. The calculator 767 may modify the estimated frame gain $g_f$ 717 under some specific conditions. For example, the frame gain $g_f$ can be attenuated according to relation (51) under given values of high-band voicing factor $v_{HB}$ 230 (FIG. 2) and MSE excess error energy $E_{err}$ as shown in relation (51):

$$g_f \leftarrow f_{att} \cdot g_f, \quad \text{if} \quad v_{HB} > 0.1 \quad \text{AND} \quad E_{err} > 5.0 \tag{51}$$

where $E_{err}$ is the MSE excess error energy calculated in relation (30) and $f_{att}$ is an attenuation factor for example calculated as:

$$f_{att} = 1.0 - 0.04(E_{err} - 5.0) \tag{52}$$

Further modifications to the frame gain $g_f$ under some specific conditions are described in Reference [1].

The calculator 767 then quantizes the modified frame gain using the frame gain quantizer of the encoder of the SWB TBE tool of Reference [1].

Finally, the calculator 767 determines the synthesized high-band sound signal 718 using, for example, the following relation (53):

$$\hat{s}_{HB}(n) = g_f \cdot \hat{y}_{HB}(n), \quad n = 0, \ldots, N-1 \tag{53}$$

7. EXAMPLE CONFIGURATION OF HARDWARE COMPONENTS

Figure 9:
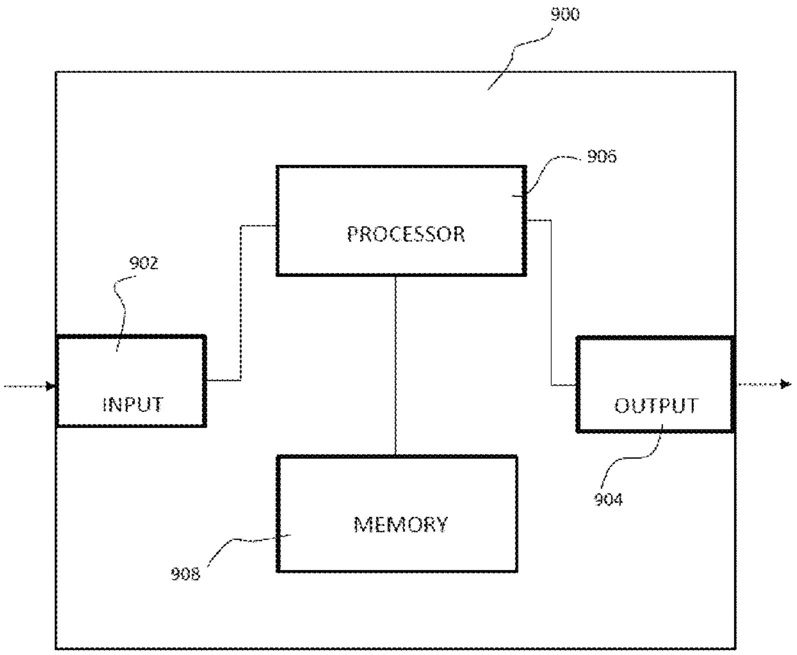
FIG. 9 is a simplified block diagram of an example configuration of hardware components forming the method and device for time-domain bandwidth expansion of an excitation signal during encoding/decoding of a cross-talk sound signal.

FIG. 9 is a simplified block diagram of an example configuration of hardware components forming the above-described method 200 and device 250 for time-domain bandwidth extension of an excitation signal during encoding/decoding of a cross-talk signal (herein after "method 200 and device 250).

The method 200 and device 250 may be implemented as a part of a mobile terminal, as a part of a portable media player, or in any similar device. The device 250 (identified as 900 in FIG. 9) comprises an input 902, an output 904, a processor 906 and a memory 908.

The input 902 is configured to receive the input signal. The output 904 is configured to supply the time-domain bandwidth expanded excitation signal. The input 902 and the output 904 may be implemented in a common module, for example a serial input/output device.

The processor 906 is operatively connected to the input 902, to the output 904, and to the memory 908. The processor 906 is realized as one or more processors for executing code instructions in support of the functions of the various operations and elements of the above described method 200 and device 250 as shown in the accompanying figures and/or as described in the present disclosure.

The memory 908 may comprise a non-transient memory for storing code instructions executable by the processor 906, specifically, a processor-readable memory comprising/storing non-transitory instructions that, when executed, cause a processor to implement the operations and elements of the method 200 and device 250. The memory 908 may also comprise a random access memory or buffer(s) to store intermediate processing data from the various functions performed by the processor 908.

Those of ordinary skill in the art will realize that the description of the method 200 and device 250 are illustrative only and are not intended to be in any way limiting. Other embodiments will readily suggest themselves to such persons with ordinary skill in the art having the benefit of the present disclosure. Furthermore, the disclosed method 200 and device 250 may be customized to offer valuable solutions to existing needs and problems of encoding and decoding sound.

In the interest of clarity, not all of the routine features of the implementations of the method 200 and device 250 are shown and described. It will, of course, be appreciated that in the development of any such actual implementation of the method 200 and device 250, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of sound processing having the benefit of the present disclosure.

In accordance with the present disclosure, the elements, processing operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations and sub-operations is implemented by a processor, computer or a machine and those operations and sub-operations may be stored as a series of non-transitory code instructions readable by the processor, computer or machine, they may be stored on a tangible and/or non-transient medium.

Processing operations and elements of the method 200 and device 250 as described herein may comprise software, firmware, hardware, or any combination(s) of software, firmware, or hardware suitable for the purposes described herein.

In the method 200 and device 250, the various processing operations and sub-operations may be performed in various orders and some of the processing operations and sub-operations may be optional.

Although the present disclosure has been described hereinabove by way of non-restrictive, illustrative embodiments thereof, these embodiments may be modified at will within the scope of the appended claims without departing from the spirit and nature of the present disclosure.

8. REFERENCES

The present disclosure mentions the following references, of which the full content is incorporated herein by reference:

[1] 3GPP TS 26.445, *"EVS Codec Detailed Algorithmic Description,"* 3GPP Technical Specification (Release 12) (2014)—Sections 5.2.6.1 and 6.1.5.1.

[2] Bessette, B., Lefebvre, R., Salami, R. et al. "*Techniques for high-quality ACELP coding of wideband speech*". Int. Conference EUROSPEECH 2001 Scandinavia, 7th European Conference on Speech Communication and Technology, 2nd INTERSPEECH Event, Aalborg, Denmark, Sep. 3-7, 2001.

What is claimed is:

1. A method for time-domain bandwidth expansion of an excitation signal during decoding of a cross-talk sound signal, comprising:
- decoding a high-band mixing factor received in a bitstream, wherein decoding the high-band mixing factor comprises decoding a quantized normalized gain received in the bitstream and calculating the high-band mixing factor using the decoded quantized normalized gain; and
- mixing a low-band excitation signal and a random noise excitation signal using the high-band mixing factor to produce the time-domain bandwidth expanded excitation signal.

2. The method according to claim 1, further comprising: interpolating an energy of the random noise excitation signal between a previous frame and a current frame of the sound signal to smoothen transition between the previous and current frames.

3. The method according to claim 2, further comprising: for interpolating the energy of the random noise excitation signal, scaling the random noise excitation signal in a portion of the current frame.

4. The method according to claim 1, further comprising: interpolating the high-band mixing factor between a previous and a current frame of the sound signal to ensure smooth transition between the previous and current frames.

5. The method according to claim 1, further comprising: estimating quantized gain/shape parameters.

6. A method for time-domain bandwidth expansion of an excitation signal during encoding of a cross-talk sound signal, comprising:
- calculating a high-band mixing factor usable for mixing a low-band excitation signal and a random noise excitation signal to produce the time-domain bandwidth expanded excitation signal;
- wherein calculating the high-band mixing factor comprises calculating and quantizing a gain from which the high-band mixing factor is obtained.

7. The method according to claim 6, further comprising:
- calculating (a) a high-band residual signal using the sound signal and (b) a temporal envelope of the high-band residual signal;
- calculating a high-band voicing factor based on the temporal envelope of the high-band residual signal; and
- estimating gain/shape parameters using the high-band voicing factor.

8. The method according to claim 7, wherein calculating the high-band voicing factor comprises (a) calculating a high-band autocorrelation function based on the temporal envelope, and (b) using the high-band autocorrelation function to calculate the high-band voicing factor.

9. The method according to claim 7, wherein calculating the high-band voicing factor comprises downsampling the temporal envelope of the high-band residual signal by a given factor, dividing the downsampled temporal envelope into a number of segments, calculating a mean value of each segment of the downsampled temporal envelope, and per-segment normalization of the downsampled temporal envelope of the high-band residual signal, and wherein per-segment normalization of the downsampled temporal envelope comprises (a) calculating segmental normalization factors from the calculated mean values, (b) interpolating the segmental normalization factors in a current frame, and (c) normalizing the downsampled temporal envelope using the interpolated segmental normalization factors.

10. The method according to claim 7, further comprising: calculating a tilt of the temporal envelope of the high-band residual signal based on a linear least squares method.

11. The method according to claim 6, wherein calculating the high-band mixing factor further comprises:
- generating the random noise excitation signal;
- mixing the low-band excitation signal with the random noise excitation signal, and minimizing a mean squared error between the mixed excitation signal and a high-band residual signal calculated from the sound signal; and
- calculating a temporal envelope of the random noise excitation signal, calculating a temporal envelope of the low-band excitation signal, and finding respective gains for the temporal envelopes of the random noise excitation signal and the low-band excitation signal by means of mean squared error minimization process.

12. The method according to claim 11, wherein calculating the high-band mixing factor comprises scaling the gains for the temporal envelopes of the random noise excitation signal and the low-band excitation signal, wherein scaling the gains comprises obtaining a single gain parameter, and wherein calculating the high-band mixing factor comprises quantizing the single gain parameter to obtain the said quantized gain from which the high-band mixing factor is obtained.

13. The method according to claim 7, wherein the gain/shape parameters are selected from the group comprising:
- a spectral shape of a high-band target signal;
- subframe gains of the high-band target signal;
- a frame gain parameter.

14. The method according to claim 7, wherein:
- estimating the gain/shape parameters comprises calculating a temporal tilt of the gain/shape parameters; and
- calculating the temporal tilt comprises interpolating the gain/shape parameters.

15. The method according to claim 7, wherein:
- estimating the gain/shape parameters comprises smoothing the gain/shape parameters using an adaptive weight parameter calculated using the high-band voicing factor; and
- the method further comprising:
- smoothing of the gain/shape parameters using the adaptive weight parameter in response to a given condition involving the high-band voicing factor.

16. The method according to claim 15, wherein estimating the gain/shape parameters comprises quantizing the smoothed gain/shape parameters, and interpolating and smoothing the quantized gain/shape parameters, wherein smoothing the quantized gain/shape parameters is performed by means of averaging of the quantized interpolated gain/shape parameters.

17. The method according to claim 7, wherein estimating the gain/shape parameters comprises adaptive attenuation of a frame gain parameter using a MSE excess error.

18. A device for time-domain bandwidth expansion of an excitation signal during decoding of a cross-talk sound signal, comprising:

at least one processor; and a memory coupled to the processor and storing non-transitory instructions that when executed cause the processor to implement:

a decoder of a high-band mixing factor received in a bitstream, wherein the decoder of the high-band mixing factor decodes a quantized normalized gain received in the bitstream and calculates the high-band mixing factor using the decoded quantized normalized gain; and a mixer of a low-band excitation signal and a random noise excitation signal using the high-band mixing factor to produce the time-domain bandwidth expanded excitation signal.

19. The device according to claim 18, further comprising: a generator of the random noise excitation signal which interpolates an energy of the random noise excitation signal between a previous frame and a current frame of the sound signal to smoothen transition between the previous and current frames.

20. The device according to claim 19, wherein, for interpolating the energy of the random noise excitation signal, the generator of the random noise excitation signal scales the random noise excitation signal in a portion of the current frame.

21. The device according to claim 18, wherein the decoder of the high-band mixing factor interpolates the high-band mixing factor between a previous and a current frame of the sound signal to ensure smooth transition between the previous and current frames.

22. The device according to claim 18, further comprising: an estimator of quantized gain/shape parameters.

23. A device for time-domain bandwidth expansion of an excitation signal during encoding of a cross-talk sound signal, comprising:

at least one processor; and a memory coupled to the processor and storing non-transitory instructions that when executed cause the processor to implement:

a calculator of a high-band mixing factor usable for mixing a low-band excitation signal and a random noise excitation signal to produce the time-domain bandwidth expanded excitation signal;

wherein the calculator of the high-band mixing factor is configured to calculate and quantize a gain from which the high-band mixing factor is obtained.

24. The device according to claim 23, further comprising:

a calculator of (a) a high-band residual signal using the sound signal and (b) a temporal envelope of the high-band residual signal;

a calculator of a high-band voicing factor based on the temporal envelope of the high-band residual signal; and an estimator of gain/shape parameters using the high-band voicing factor.

25. The device according to claim 24, wherein the calculator of the high-band voicing factor calculates a high-band autocorrelation function based on the temporal envelope, and uses the high-band autocorrelation function to calculate the high-band voicing factor.

26. The device according to claim 24, wherein:

the calculator of the high-band voicing factor comprises a downsampler of the temporal envelope of the high-band residual signal by a given factor, a divider of the downsampled temporal envelope into a number of segments, a calculator of a mean value of each segment of the downsampled temporal envelope, and a per-segment normalizer of the downsampled temporal envelope of the high-band residual signal; and the per-segment normalizer (a) calculates segmental normalization factors from the calculated means values, (b) interpolates the segmental normalization factors in a current frame, and (c) normalizes the downsampled temporal envelope using the interpolated segmental normalization factors.

27. The device according to claim 23, wherein the calculator of the high-band mixing factor:

comprises a generator of the random noise excitation signal;

mixes the low-band excitation signal with the random noise excitation signal, and minimizes a mean squared error between the mixed excitation signal and a high-band residual signal calculated from the sound signal; and comprises a calculator of a temporal envelope of the random noise excitation signal and a calculator of a temporal envelope of the low-band excitation signal, and (b) finds respective gains for the temporal envelopes of the random noise excitation signal and the low-band excitation signal by means of a mean squared error minimization process.

28. The device according to claim 27, wherein the calculator of the high-band mixing factor scales the gains for the temporal envelopes of the random noise excitation signal and the low-band excitation signal, wherein, to scale the gains for the temporal envelopes of the random noise excitation signal and the low-band excitation signal, the calculator of the high-band mixing factor calculates a single gain parameter and quantizes the single gain parameter to obtain the said quantized gain from which the high-band mixing factor is obtained.

29. The device according to claim 24, wherein the gain/shape parameters are selected from the group comprising:

a spectral shape of a high-band target signal;

subframe gains of the high-band target signal;

a frame gain parameter.

30. The device according to claim 29, wherein the gain/shape parameters comprise subframe gains of the high-band target signal, and wherein the estimator of the gain/shape parameters comprises a calculator of a temporal tilt of the subframe gains comprising an interpolator of the subframe gains.

31. The device according to claim 29, wherein the gain/shape parameters comprise subframe gains of the high-band target signal, and the estimator of the gain/shape parameters comprises a smoother of the subframe gains using an adaptive weight parameter, wherein the smoother of the subframe gains calculates the adaptive weight parameter using the high-band voicing factor and smooths the gain/shape parameters using the adaptive weight parameter in response to a given condition involving the high-band voicing factor.

32. The device according to claim 31, wherein the estimator of the gain/shape parameters comprises a quantizer of the subframe gains, an interpolator of the quantized subframe gains, a smoother of the subframe gains, wherein the smoother of the subframe gains smoothes the quantized gain/shape parameters by means of averaging of the quantized interpolated gain/shape parameters.

33. The device according to claim 29, wherein the gain/shape parameters comprise a frame gain of the high-band target signal, and wherein the estimator of the gain/shape parameters performs adaptive attenuation of the frame gain parameter using a MSE excess error.

34. A device for time-domain bandwidth expansion of an excitation signal during decoding of a cross-talk sound signal, comprising:

at least one processor; and a memory coupled to the processor and storing non-transitory instructions that when executed cause the processor to:

decode a high-band mixing factor received in a bitstream, comprising decoding a quantized normalized gain received in the bitstream and calculating the high-band mixing factor using the decoded quantized normalized gain; and mix a low-band excitation signal and a random noise excitation signal using the high-band mixing factor to produce the time-domain bandwidth expanded excitation signal.

35. A device for time-domain bandwidth expansion of an excitation signal during encoding of a cross-talk sound signal, comprising:

at least one processor; and a memory coupled to the processor and storing non-transitory instructions that when executed cause the processor to:

calculate a high-band mixing factor usable for mixing a low-band excitation signal and a random noise excitation signal to produce the time-domain bandwidth expanded excitation signal;

wherein, to calculate the high-band mixing factor, the processor calculates and quantizes a gain from which the high-band mixing factor is obtained.

* * * * *